United States Patent
Weaver et al.

(10) Patent No.: US 7,784,264 B2
(45) Date of Patent: Aug. 31, 2010

(54) SLIDABLE SPRING-LOADED TRANSITION-TO-TURBINE SEAL APPARATUS AND HEAT-SHIELDING SYSTEM, COMPRISING THE SEAL, AT TRANSITION/TURBINE JUNCTION OF A GAS TURBINE ENGINE

(75) Inventors: Adam J. Weaver, Oviedo, FL (US); Raymond S. Nordlund, Orlando, FL (US); David B. Allen, Oviedo, FL (US); Daniel O. Davies, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 1063 days.

(21) Appl. No.: 11/498,478

(22) Filed: Aug. 3, 2006

(65) Prior Publication Data

US 2008/0053107 A1  Mar. 6, 2008

(51) Int. Cl.
F04D 29/04 (2006.01)
F23R 3/42 (2006.01)
(52) U.S. Cl. ............ 60/39.37; 60/752; 60/805
(58) Field of Classification Search ........... 60/39.37, 60/752, 780, 805, 806; 415/138, 110, 113
See application file for complete search history.

(56) References Cited

U.S. PATENT DOCUMENTS

| | | | | |
|---|---|---|---|---|
| 2,625,013 | A | * | 1/1953 | Howard et al. ............ 60/800 |
| 4,029,432 | A | | 6/1977 | Meylan et al. |
| 4,232,527 | A | | 11/1980 | Reider |
| 4,465,284 | A | * | 8/1984 | Szema ............... 415/180 |
| 4,552,509 | A | | 11/1985 | Schweikl et al. |
| 4,706,453 | A | | 11/1987 | Vivace |
| 4,747,750 | A | | 5/1988 | Chlus et al. |
| 5,125,796 | A | | 6/1992 | Cromer |
| 5,265,412 | A | | 11/1993 | Bagepalli et al. |
| 5,407,237 | A | | 4/1995 | Smolowitz |
| 5,749,218 | A | | 5/1998 | Cromer et al. |
| 5,987,879 | A | | 11/1999 | Ono |
| 6,345,494 | B1 | | 2/2002 | Coslow |
| 6,442,946 | B1 | | 9/2002 | Kraft et al. |
| 6,450,762 | B1 | | 9/2002 | Munshi |
| 6,547,257 | B2 | | 4/2003 | Cromer |
| 6,588,214 | B2 | | 7/2003 | Mack et al. |
| 6,834,507 | B2 | | 12/2004 | Jorgensen |

(Continued)

FOREIGN PATENT DOCUMENTS

JP  2003-185140  *  7/2003

*Primary Examiner*—Ted Kim

(57) ABSTRACT

One embodiment of a transition-to-turbine seal (300) comprises a first, flattened section (302) adapted to be received in a peripheral axial slot (320) of a transition (325), and a second, generally C-shaped section (301). The generally C-shaped section (301) comprises a flattened portion (305) near the first, flattened section (302), and a curved portion (306) extending to a free edge (307). A fiber metal strip component (309) may be attached to the flattened portion (305) to define a first engagement surface adapted to engage an upstream side (336) of an outer vane seal rail (337), and a second engagement surface 308, adjacent the free edge (307), provides an opposed wear surface adapted to engage a downstream side (338) of the outer vane seal rail (337). System embodiments also are described, in which such transition-to-turbine seal (300) is isolated from a hot gas path (350) by provision of a plurality of cooling apertures (327) in the transition (325).

21 Claims, 6 Drawing Sheets

U.S. PATENT DOCUMENTS

| | | | |
|---|---|---|---|
| 6,860,108 B2* | 3/2005 | Soechting et al. | 60/39.37 |
| 2004/0031271 A1 | 2/2004 | Jorgensen | |
| 2005/0095122 A1 | 5/2005 | Friedl et al. | |
| 2005/0241314 A1* | 11/2005 | Takaya et al. | 60/752 |
| 2006/0123797 A1* | 6/2006 | Zborovsky et al. | 60/800 |
| 2006/0127219 A1* | 6/2006 | Zborovsky | 415/229 |

* cited by examiner

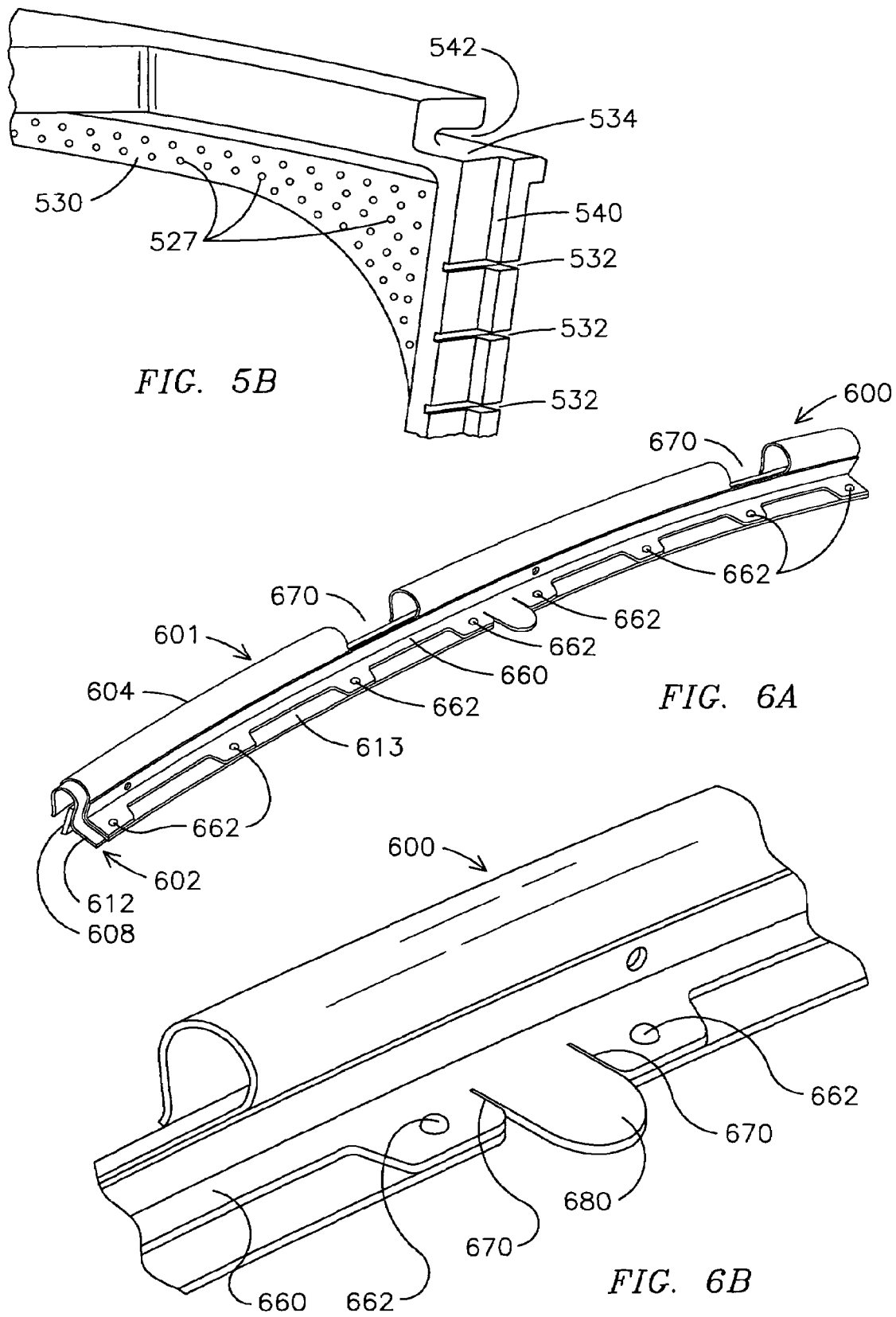

SLIDABLE SPRING-LOADED TRANSITION-TO-TURBINE SEAL APPARATUS AND HEAT-SHIELDING SYSTEM, COMPRISING THE SEAL, AT TRANSITION/TURBINE JUNCTION OF A GAS TURBINE ENGINE

FIELD OF INVENTION

The invention generally relates to a gas turbine engine, and more particularly to a seal between a transition and a turbine of such engine.

BACKGROUND OF THE INVENTION

In gas turbine engines, air is compressed at an initial stage, then is heated in combustion chambers, and the hot gas so produced passes to a turbine that, driven by the hot gas, does work which may include rotating the air compressor.

In a typical industrial gas turbine engine a number of combustion chambers combust fuel and hot gas flowing from these combustion chambers is passed via respective transitions (also referred to by some in the field as ducts or transition pieces) to respective entrances of the turbine. More specifically, a plurality of combustion chambers commonly are arranged radially about a longitudinal axis of the gas turbine engine, and likewise radially arranged transitions respectively comprise outlet ends that converge to form an annular inflow of hot gas to the turbine entrance. Each transition exit is joined by a seal to one or more turbine components, the latter known in various designs as row 1 vane segments. Adjacent component growth variances due to thermal expansion, thermal stresses, and vibrational forces from combustion dynamics all affect design criteria and performance of such a seal, referred to herein as a transition-to-turbine seal. Consequently, the design of such seal has presented a challenge that resulted in various approaches that attempt to find a suitable balance between seal cost, reliability, durability, installation and repair ease, performance, and effect on adjacent components.

For example, U.S. Pat. No. 5,265,412, issued Nov. 30, 1993 to Bagepalli et al., teaches the use of flexible brush seals that are positioned between the transition and turbine entrance. An exemplary embodiment comprises a sealing cap solidly affixed to a first stage nozzle of the turbine, extending over a brush seal positioned at the end of the transition and an extending flexible brush radially outward to contact the adjacent sealing cap. An alternative embodiment provides the brush on the turbine component and the sealing cap extending from the transition (see FIG. 8). U.S. Pat. No. 5,749,218, issued May 12, 1998 to Cromer and Potter, illustrates a prior art flexible seal, one end of which fits into a U-shaped slot in the transition. The other end engages the first stage of the turbine. Recognizing a problem of wear in the U-shape slot, the inventors of U.S. Pat. No. 5,749,218 solve this problem by inserting an insert into the slot that is comprised of a harder alloy than the metal forming the slot. This is stated to increase the effective wear resistance of the slot.

Also, FIG. 3 of U.S. Pat. No. 6,442,946, issued Sep. 3, 2002 to Kraft et al., depicts a prior art seal that engages a vertical flange on a transition and inserts into a groove in an adjacent transition member. The engagement about the transition appears to be a relatively thick casting that would "float," and is not indicated as spring-loaded. In contrast, U.S. Pat. No. 6,547,257, issued Apr. 15, 2005 to Cromer, discloses a transition piece seal comprising a transition piece seal support having a first flange for supporting a transition piece seal, and a second flange adapted for mounting in an adjacent nozzle, and a spring seal element itself comprising a mounting flange adapted to engage the second flange and a flex portion, embodied as spring seal elements, having a free edge adapted to engage the nozzle's forward face. In an exemplary embodiment, a cloth seal extends from the first flange into an upstanding groove or channel formed by flanges of a transition. The spring seal elements are stated to provide two separating sealing interfaces, one along the nozzle's forward face, and the other resulting from spring-biased downward pressure upon the second flange which is inserted into a slot in the nozzle.

Further, regarding wear and overall performance, it is appreciated that the initial close tolerances of newly installed "floating" type seals are not retained over the component life. Wear results in larger gaps, through which compressed air enters the hot gas path. Such air loss is expected to reduce performance efficiency and increase No, emissions. Also, for turbine designs that utilize a plurality of row 1 vane segments per transition, the independent movement of adjacent row 1 vane segments increases the dynamic challenges placed on a transition-to-turbine seal for such configuration.

Accordingly, each of the above and other known approaches to transition-to-turbine seals has one or more factors that argue against its use in advanced-design gas turbine engines that seek to attain greater performance and emissions efficiencies. Thus, there remains a need for an improved transition-to-turbine seal.

BRIEF DESCRIPTION OF THE DRAWINGS

The invention is explained in following description in view of the drawings that show:

FIG. 2 provides a cross-sectional view of the junction of a prior art interface of a transition with a front end of a turbine, further depicting a prior art seal there between.

FIG. 4 also depicts an optional dimple strip.

FIG. 5B provides a perspective view, looking downstream and slightly downward, of a corner of the transition of FIG. 5A, and depicts additional details.

FIG. 6A provides a perspective view, looking downstream and downward, of an outer transition-to-turbine seal embodiment. FIG. 6B provides a close-up view of a portion of the seal depicted in FIG. 6A.

DETAILED DESCRIPTION OF EMBODIMENTS OF THE INVENTION

Figure 1:
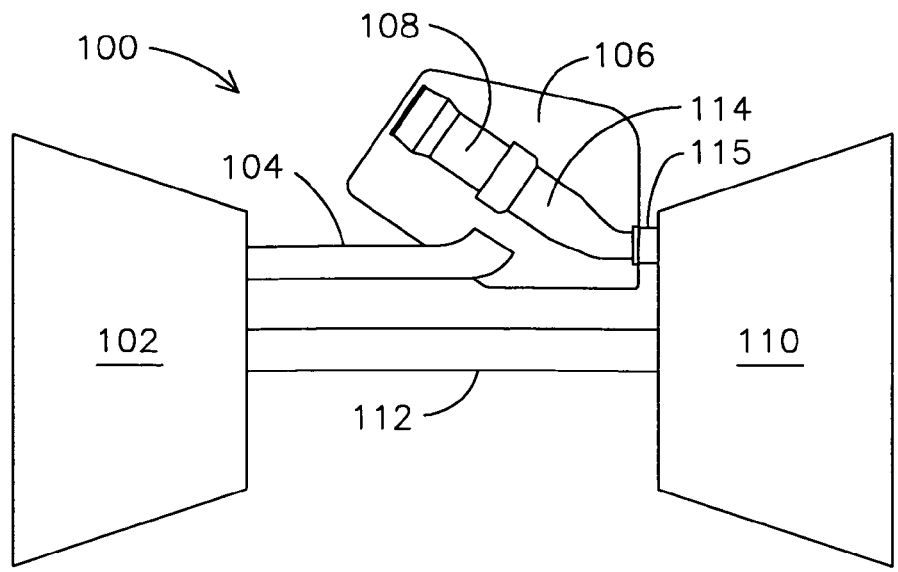
FIG. 1 provides a schematic cross-sectional depiction of a prior art gas turbine engine.

A transition-to-turbine interface comprising a spring-loaded member for insertion over a row 1 vane segment flange could, it was hypothesized, substantially reduce air losses through the seal, and reduce wear on the relatively expensive row 1 vane segments by permitting relatively unencumbered sawtoothing motion. A spring-loaded seal was conceptualized as a solution to the multiple design and performance challenges of a transition-to-turbine seal. Initial trials of a spring-loaded seal, however, resulted in unacceptable, catastrophic component failure.

Thereafter, it was realized that, despite such initial failure, a spring-loaded transition-to-turbine seal could endure under turbine operating conditions if it could be removed from or isolated from the flow path of hot, combusted gases. After such problem identification and realization of an approach to a solution, embodiments of a spring-loaded transition-to-turbine seal, and a system that comprises such seal, were developed and evaluated.

Further, it was appreciated that one of the main causes for binding of prior art seals is the large thermal gradient that exists between the transition and row 1 vane during turbine operation. This problem, and the problem of failure of a spring-metal seal due to excessive heat exposure, have been solved by removing the redesigned exit seal from the flow path and adding appropriate apertures on the transition exit face that are effective to keep the hot gases flushed from a cavity between the transition and row 1 vane. Keeping the thermal gradient across the seal to a minimum is one aspect for minimizing the binding. Another cause for the binding is the relatively high seal stiffness. Some prior art seals are thick Hast X castings that are not flexible. Without being limiting, embodiments of the present seal may be made of multi-ply IN X-750 sheet metal, which is heat treated for spring properties. This and other materials that have suitable spring and thermal resistance qualities may be used in various embodiments. Additionally, on various embodiments a spring-loaded section, C-shaped in cross-sectional profile, fits over the vane seal rail with a sliding engagement. This allows each row 1 vane segment to radially "saw-tooth", without causing seal binding. The transition is also slotted in the axial direction to allow free axial movement between the seal and transition. By keeping the seal embodiments free from radial and axial binding, significantly less load is expected to be transferred to the mating components. Also, as discussed below, some embodiments employ a multi-ply construction that further dampens load transfer.

It is further appreciated that due to the tolerance and assembly stack of the mating components, as well as variation in row 1 vane thermal deflections, the binding between a prior art 'floating' seal and the mating transition and row 1 vane segment is not consistent. As a result, leakage in this area is unacceptably high and not consistent from engine to engine. Having inconsistent leakage means that it is also unpredictable, which is a problem for predicting future performance. The new seal embodiments as disclosed herein have significantly reduced the binding problem by implementing the changes discussed above, which in turn, will reduce the amount of air leakage at the transition exit. Additionally, new seal embodiments are more compliant than the typical prior art cast seal design. This allows the steady state pressures to make the seal more conforming to the sealing surfaces and thus reduce air leakage. All the efforts to reduce binding and make the seal embodiments more flexible are believed to contribute to reduced leakage throughout life of the respective seal.

Another design change that was made to address the unacceptable and unpredictable leakage was to provide an interference fit between the redesigned exit seal and row 1 vane seal rail. By imposing an interference fit, the design is assured to have the same starting point from assembly. That is, the seal is no longer "floating" with large clearances between mating components. In various embodiments, the form of the interference fit is a C-shaped spring metal section (also referred to as a preloaded spring clip) that fits over a respective seal rail of the row 1 vane segment.

In addition to the preloaded spring clip, in some embodiments a fiber metal material on the seal is utilized at the row 1 vane interface. This fiber metal is used as a "wear to fit" material. That is, as the row 1 vane axially sawtooths, the fiber metal is "worn in" as a result of dynamic motion of the seal relative to the row 1 vane. More particularly, a fiber metal strip may accommodate non-uniform axial deflections imparted to the row 1 vane segments such that a seal rail will "wear" or abrade into the fiber metal material during axial sawtoothing. This is predicted to reduce leakage by creating more contact between the fiber metal material and the row 1 vane segment seal rail, and also is predicted to reduce the cyclic deflections experienced by the seal during operation.

Also, it is predicted that spring-loaded sliding engagement resulting from this arrangement of components, providing a compression loading due to the positive preload, will decrease the probability of flutter of the seal and accordingly, will decrease the probability of dynamic failure. Thus, while not being bound to a particular theory, it is believed that the seal system will significantly reduce air leakages and provide more consistent, predictable performance.

Thus, embodiments of the invention provide a number of advances over known transition-to-turbine seals, providing enhanced durability, lower wear rates of adjacent components, and increased efficiency and performance through use of a spring-loaded seal component that fits over row 1 vane segment flanges (of which seal rails are one example of such vane segment flanges). Further as to relative component wear, motivation exists to preserve adjacent, relatively more costly transition and row 1 vane segment components. Part of the increased costs of the latter two components are related to their ability to withstand increased firing temperature of gas turbine engines. Such increases in firing temperature are related to achieving desired emissions and operational efficiencies.

Following such an approach and given such higher costs for the transition and the row 1 vane segments, to tolerate such higher temperatures, the present inventors have recognized that one solution to sealing the junction between these parts is to provide a seal that is preferentially consumed yet that has a sufficient durability so as to not require frequent replacement, and that provides desirable performance characteristics for other criteria. Achieving this with various embodiments of the present invention reduces or eliminates wear-related damage to the adjacent, more costly parts while reducing the overall costs related to sealing this junction. This extends the life of the relatively more costly row 1 vane segments. Thus, embodiments of the invention comprise a relatively consumable transition-to-turbine seal that provides axial and radial freedom to adjacent components without causing excessive, uneven, or less predictable wear on those adjacent parts. The seal components are renewable in that they may be replaced at desired intervals.

Generally speaking, transition-to-turbine seal embodiments of the present invention comprise a seal component comprising a first, flattened section adapted to be received in a peripheral axially oriented slot at a transition outlet end, and a second, generally C-shaped section adapted to slideably engage, with a spring-loaded sliding engagement, a plurality of row 1 vane segments of the turbine. In some embodiments, the generally C-shaped section itself may comprise a flattened portion along one side, with a wear surface adapted to contact one side of a row 1 vane segment flange, and a curved portion extending to a free end. The flattened portion is spaced apart a specified distance from a free end at the end of curved portion. The specified distance in an unflexed seal is less than the thickness of the row 1 vane segment flange over which it is to fit, and the generally C-shaped section may be stretched so the free end contacts the opposing side of the row 1 vane segment flange to create a spring-loading over the row 1 vane segment flange. This provides a selected spring-loading sliding engagement as is described herein in greater detail for certain embodiments.

This seal design accommodates axial and radial "sawtoothing" of the vane segments. More particularly, embodiments provide greater freedom of relative motion between adjacent row 1 vane segments in a gas turbine. This contributes to an increased freedom, and overall displacement capability, between the transition exit and the row 1 vane segments. Less restriction of sawtoothing movement, which may be defined as the relative radial and axial displacement variation from vane segment to adjacent vane segment, reduces or eliminates wear of the adjacent seal surfaces that may be due to fretting wear. Fretting wear is a major concern in gas turbine engine design and operations. Additional aspects of various embodiments are provided with and after discussion of specific embodiments that are depicted in the attached drawings.

First, however, a discussion is provided of a common arrangement of elements of a prior art gas turbine engine. FIG. 1 provides a schematic cross-sectional depiction of a prior art gas turbine engine 100 such as may comprise various embodiments of the present invention. The gas turbine engine 100 comprises a compressor 102, a combustion chamber 108 (such as a can-annular combustion chamber), and a turbine 110. During operation, in axial flow series, compressor 102 takes in air and provides compressed air to a diffuser 104, which passes the compressed air to a plenum 106 through which the compressed air passes to the combustion chamber 108, which mixes the compressed air with fuel (not shown), providing combusted gases via a transition 114 to the turbine 110, which may generate electricity. A shaft 1 12 is shown connecting the turbine to drive the compressor 102. Although depicted schematically as a single longitudinal channel, the diffuser 104 extends annularly about the shaft 112 in typical gas turbine engines, as does the plenum 106. Air from the compressor 102 also travels to the turbine 110 by various channels (not shown in FIG. 1) to provide higher pressure air that surrounds and may enter the hot gas path as it passes through the turbine 110. A junction between the transition 114 and the turbine 110 is indicated by 115, and is the subject of further discussion herein.

Figure 2:
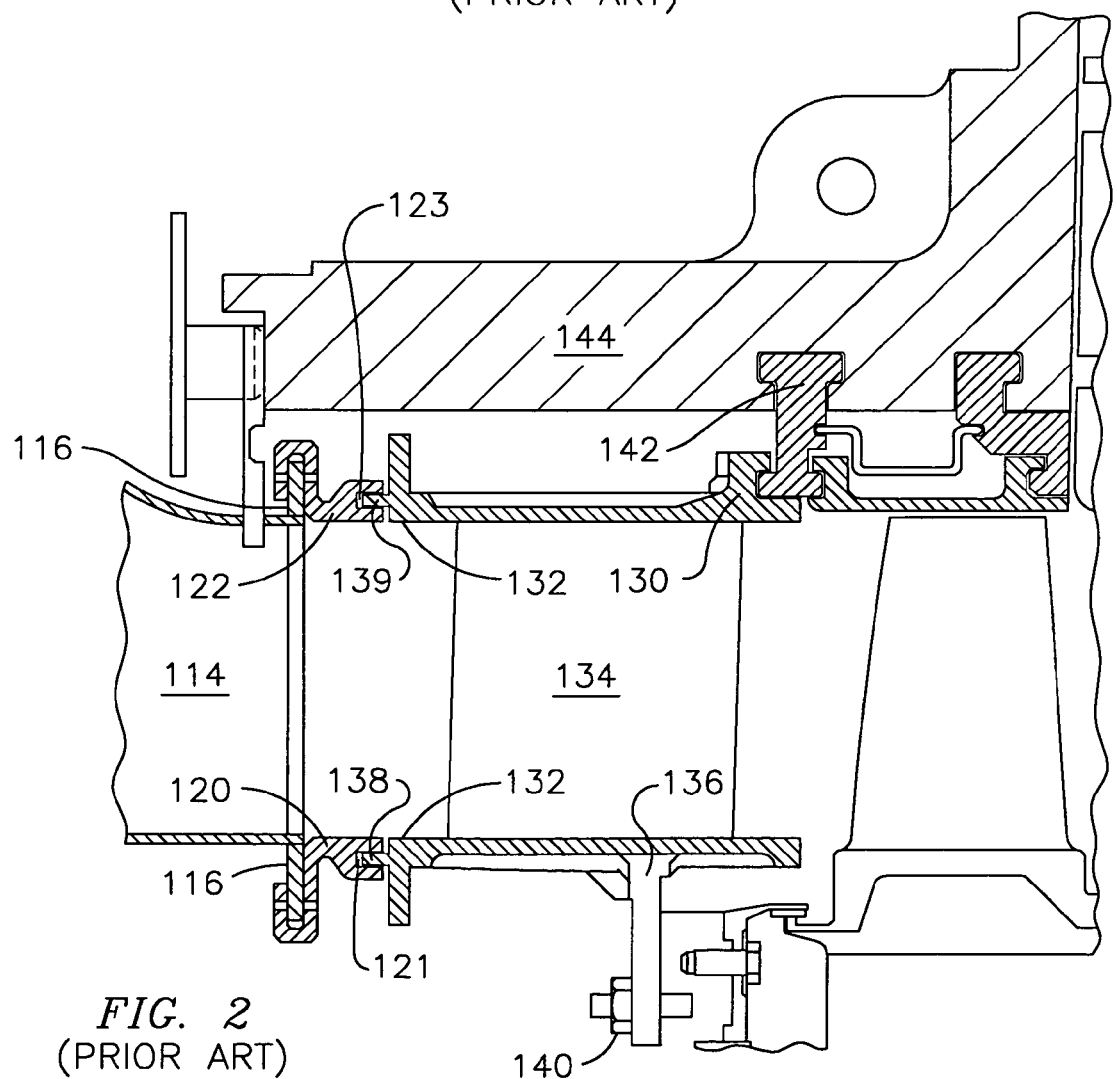

FIG. 2 provides a cross-sectional view of the junction of a transition with a front end of a turbine, such as would be found in FIG. 1 at 115. FIG. 2 depicts prior art inner and outer seals 120 and 122 for joining an exit rail 116 of transition 114 to a front end 132 of a row 1 vane segment 130. The row 1 vane segment 130 comprises a single airfoil 134 and is supported along an inner wall 136 by an inner vane attachment structure 140 and at a downstream outer end by an outer vane attachment structure 142 that connects to a row 1 turbine blade ring 144. At each of the forward inner and outer ends the row 1 vane segment 130 comprises a respective lip 138 and 139 that engages a slot 121 and 123 in the respective inner and outer mouth seals 120 and 122. Each such slot 121 and 123 provides for axial movement and limited radial movement. In view of the transient and steady state deflections and thermal and dynamic loadings, of the mating components, the interfaces of which are considered "floating" rather than spring-loaded, as well as tolerance stacks, assembly constraints, and interface wear characteristics, wear on the exit rail 116 of transition 114 may occur during operation, in part as the seals 120 and 122 experience wear and tend to transfer more dynamic load.

Figure 3A:
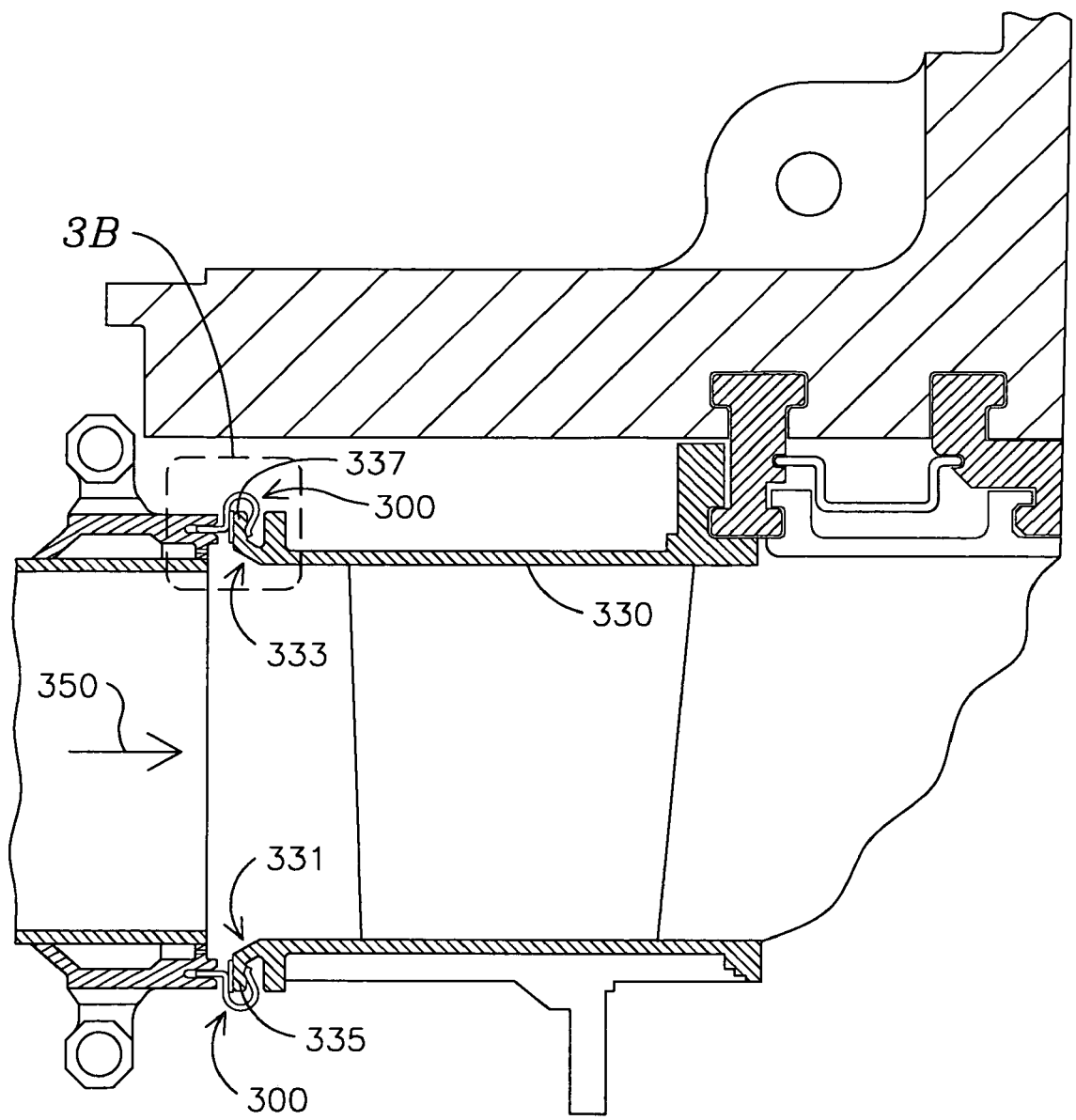
FIG. 3A provides a cross-section view of the junction of a transition with a front end of a turbine, depicting one embodiment of a transition-to-turbine seal of the present invention in such junction or interface.

Various embodiments of the present invention advance the art, in part by forming spring-loaded seals about the vane rails, which also allows for axial sawtoothing wear, and also by providing a relatively consumable transition-to-turbine seal. FIG. 3A provides a cross-section view similar to the view of FIG. 2, however depicting one embodiment of a transition-to-turbine seal 300 of the present invention. As viewable in FIG. 3A, a transition-to-turbine seal 300 is positioned at both inner and outer front ends 331 and 333 of a row 1 vane segment 330. Each end 331 and 333 comprises a respective inner and outer vane seal rail 335 and 337 extending radially outward from a hot gas path 350 (direction indicated by arrow). The row 1 vane segment 330 also is referred to in the art as a "turbine inlet" and as a "first stage nozzle."

Figure 3B:
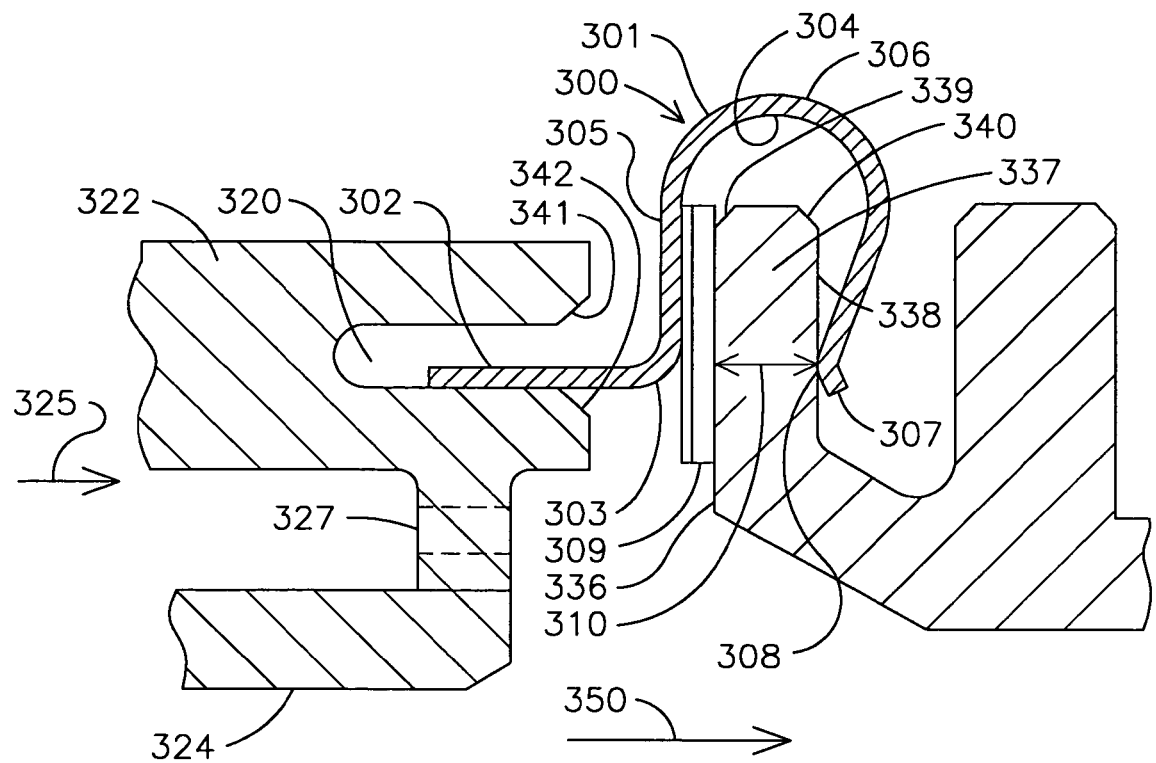
FIG. 3B provides an enlarged cross-sectional view of the region of FIG. 3A enclosed by dashed lines.

Aspects of the transition-to-turbine seal 300 are more clearly viewed in FIG. 3B, which provides an enlarged cross-sectional view of the region of FIG. 3A enclosed by dashed lines.

The transition-to-turbine seal 300 comprises a seal component 301 that comprises a first flattened section 302 and a second generally C-shaped section 304. These are shown to meet at inflection point 303. The generally C-shaped section 304 further comprises a flattened portion 305 contiguous with and adjacent the first flattened section 302 and also comprises a curved portion 306 extending to a free edge 307. The flattened portion 305 locates a first engagement surface. In FIG. 3B, a fiber metal strip 309 is affixed (such as by brazing, or any known method) along a portion of flattened portion 305 and defines the first engagement surface. That is, the first engagement surface is comprised of the portion of fiber metal strip 309 that is adapted to contact an upstream side 336 of the outer vane seal rail 337. A second engagement surface 308, shown adjacent the free edge 307, contacts a downstream side 338 of the outer vane seal rail 337. In an exemplary embodiment, not meant to be limiting, the fiber metal strip 309 may be constructed from a Hast X backing plate and fiber metal material made either from FeCrAlY or H188 materials.

As depicted, the generally C-shaped section 304 extends about both sides of outer vane seal rail 337. It is noted that, in its relaxed, unflexed state, the distance between the second engagement surface 308 and the fiber metal strip component 309 (defining the first engagement surface) is less than is shown in FIG. 3B. This is related to the spring tension applied to outer vane seal 337 by virtue of the interference fit nature of the spring-loaded seal 300. Thus, the width of the respective vertical flange, here outer vane seal rail 337, is greater than the unflexed distance between the first and second engagement surfaces. That is, the distance 310, shown between second engagement surface 308 and fiber metal strip component 309, is greater than the unflexed distance between these surfaces. The degree of spring-loading sliding engagement may be selected to attain a desired degree of resistance to movement by the first and second engagement surfaces and the seal rail, and corresponding friction. The amount of a desired interference fit to achieve a specified spring-loaded sliding engagement may be up to 1.5 mm, although it is not intended the scope of the claims be limited by the actual interference fit.

Further as to the spring-loading of the generally C-shaped section 304 and its fit over the outer vane seal rail 337, on the inner and outer vane seal rails 335 and 337 are seal rail chamfers such as are identified in FIG. 3B for the outer vane seal 337 as chamfers 339 and 340. During installation, these aid in fitting the general C-shaped section 304 over the outer vane seal rail 337. Also, outward angling from second engagement surface 308 to the thus-flared free edge 307 may assist assembly as the surface between these edges contacts chamfer 340 and with downward pressure applied furthers expansion of the generally C-shaped curve 304 to fit over outer vane seal rail 337.

Also as viewable in FIG. 3B, the flattened section 302 is adapted to be received in a peripheral axially oriented slot 320 in a component of the transition herein identified as integrated exit piece 322. This is one component of transition 325 and is affixed to transition duct 324 as further described herein. Also depicted is an area through which cooling apertures 327, shown by dotted lines, are provided. During operation these cooling apertures 327 provide an air current that forms a barrier to isolate the transition-to-turbine seal 300 from hot gas path 350. This barrier is effective to shield the transition-to-turbine seal 300 from the hot gas path 350. This in effect reduces the maximum temperature to which the transition-to-turbine seal 300 is exposed during operation. As viewable in FIG. 3B, the transition-to-turbine seal 300 provides for radial movement by virtue of the generally C-shaped section 304 allowing for its slidable engagement over the outer vane seal rail 337 and also provides for axial movement through the insertion of the first flattened section 302 into slot 320 of transition 325. While not meant to be limiting, the seal component comprising the flattened section 302 and the generally C-shaped section 304 is unitary and of a single ply. Other embodiments shown herein provide for multi-ply construction of such component 301. It is noted that chamfers 341 and 342 at the entrance of slot 320 aid in installation of the flattened section 302 into the slot 320.

Figure 3C:
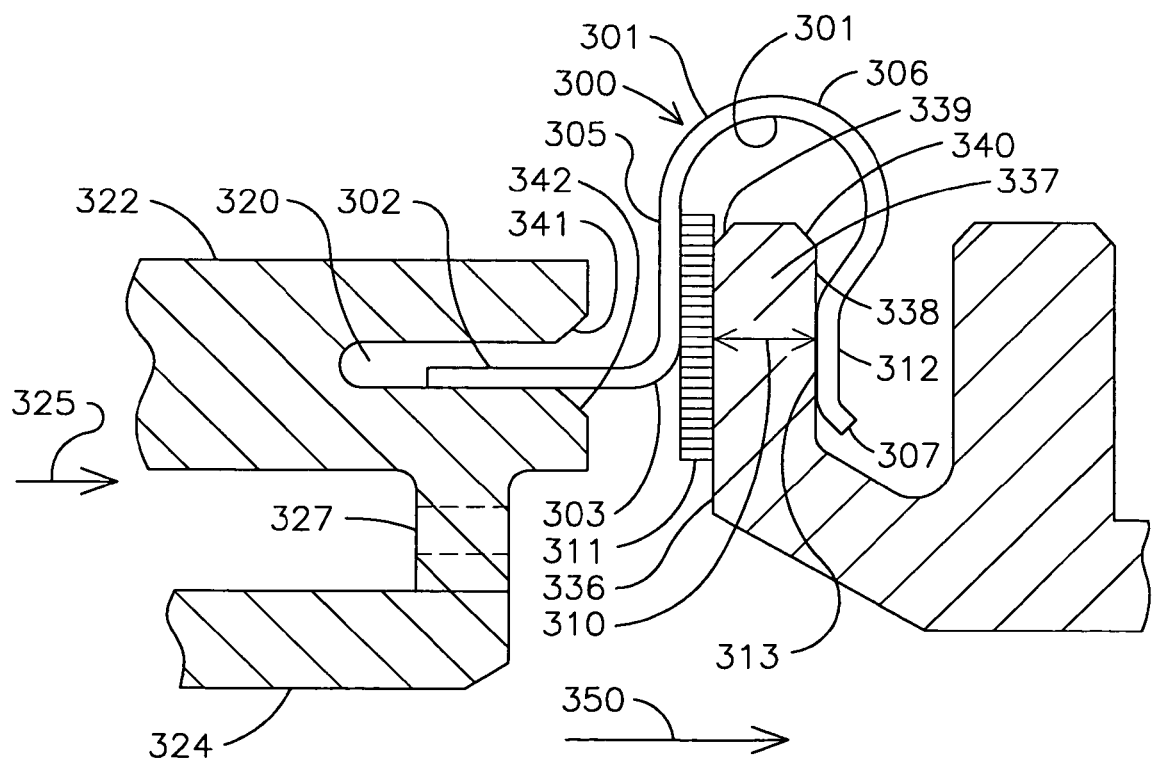
FIG. 3C provides a schematic cross-section depiction of another embodiment of a transition-to-turbine seal, positioned similarly to the seal in FIG. 3B, that depicts alternative aspects of the invention.

FIG. 3C provides a schematic cross-section depiction of another embodiment of a transition-to-turbine seal 300 in which there is no fiber metal strip component and in which opposed engagement surfaces, which may also in various embodiments be understood to function as wear surfaces, are integral with or applied to seal component 301. In this embodiment there is no fiber metal strip component as in FIG. 3B. Instead, an engagement surface 311 is attached to, and located by, flattened portion 305. The engagement surface 311 is adapted to engage upstream side 336 of the outer vane seal rail 337. Also, a second flattened portion 312, shown adjacent the free edge 307, locates a second engagement surface 313 that contacts a larger portion of downstream side 338 than the second engagement surface 308 of FIG. 3B. Thus, in this embodiment, the generally C-shaped section 301 additionally comprises a second, flattened portion (here identified as 312) that locates the second engagement surface 313. The features depicted in FIG. 3C may be provided independently or together in various embodiments of the invention.

Figure 4:
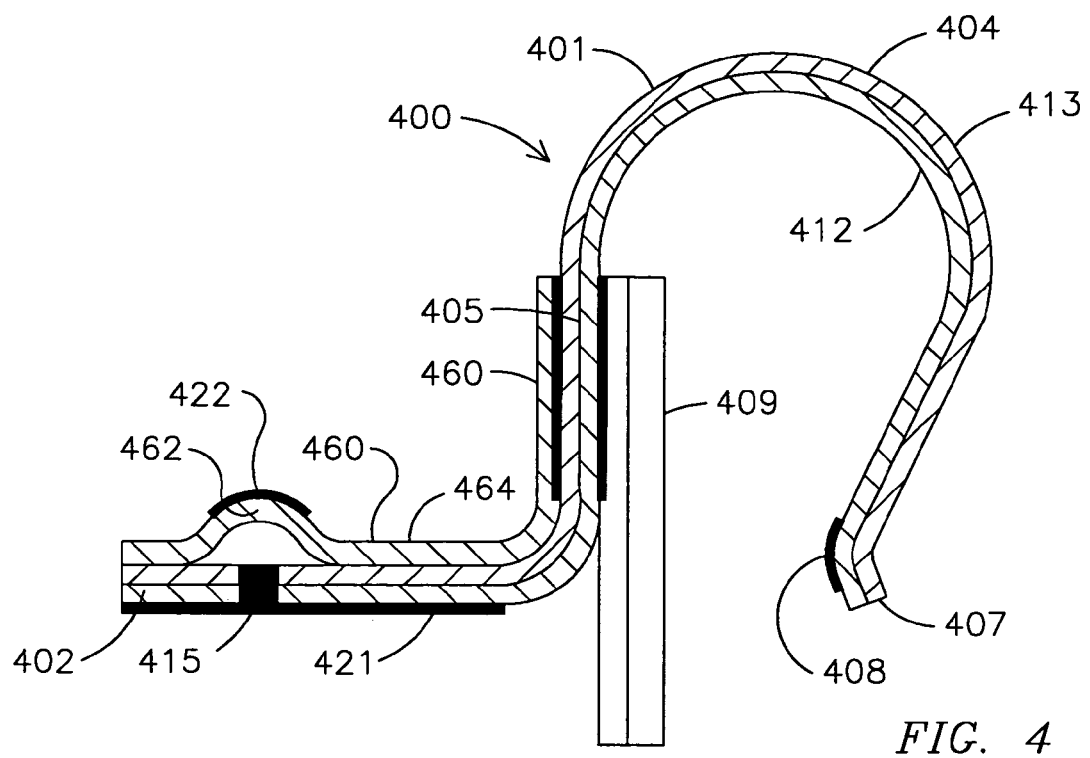
FIG. 4 is a cross section view of an alternative embodiment of a transition-to-turbine seal that depicts also three surface areas known to experience higher relative wear.

FIG. 4 provides a cross sectional view of an alternative embodiment of a transition-to-turbine seal 400 which depicts additional optional aspects of such a seal. First, a seal component 401, which is comprised of flattened section 402 and C-shaped section 404, is comprised of two layers, an inner layer 412 and an outer layer 413. This is but one example of utilizing multi-plies in the construction of such seal, which is viewed to improve the vibration dampening capability of the seal 400. For example, as the inner and outer plies 412 and 413 of the seal 400 depicted in FIG. 4 are dynamically loaded, they rub against each other. Since there is friction between the plies, the rubbing produces additional structural dampening which reduces the dynamic response. For example, for a given load that excites the seal 400, the dynamic response of the seal will vary depending on the amount of dampening. The more dampening, the less dynamic response and the less dynamic load on the seal. Without being bound to a particular theory, it is believed that a multiple ply design also reduces the stresses and improves fatigue life of the C-shaped section 404 that fits over a vane rail of a row 1 vane segment.

Also related to the inner and outer plies 412 and 413, is depicted in FIG. 4 a spot weld location 415 which is along flattened section 402. In one embodiment, not to be limiting, the thickness of the inner layer 412 and the outer layer 413 are each 0.4 mm, and these layers 412 and 413 are made of a material such as spring tempered IN X-750.

A second optional feature of a transition-to-turbine seal embodiment of the present invention is a dimple strip 460. The dimple strip 460 in FIG. 4 is shown to comprise a dimple 462. As depicted elsewhere, each dimple strip 460 is comprised of a number of dimples such as 462 that are spaced apart. In one embodiment, the dimple strip 460 is comprised of 0.4 mm thick sheet with dimples such as 462 formed in the ply near the upstream end of the straight section 464 of the dimple strip 460. The material for the dimple strip 460 may be spring tempered steel. The dimple strip 460 is braised to the flattened portion 405 of the generally C-shaped section 404 as shown in FIG. 4 by a first bold line. Similarly, fiber metal strip 409 is braised on the opposite side of the flattened portion 405 as indicated in FIG. 4 by a second bold line.

Also depicted in FIG. 4 are wear resistant coatings identified as 421 and 422, and a wear resistant coating also is applied adjacent free edge 407 to define second engagement surface 408. A wear resistant coating may be integral with respective components or may be applied during manufacturing or prior to assembly. As one example, these surfaces underlying what is identified as 421, 422, and 408 may be coated with T104-CS, which is a cobalt-based electroplated wear resistant coating. This is a lubricious coating, that is, during operation a thin layer of oxide develops on the surface, and this oxide layer is responsible for wear resistance for favorable wear resistant characteristics. This coating is not meant to be limiting however.

It is also appreciated more generally, that a wear resistant coating may be applied to the inside surface of flattened portion 405 in place of the fiber metal strip 409 depicted in FIG. 4. In such embodiment, flattened portion 405 defines a first engagement surface that functions as a wear surface. This statement, however, is not meant to indicate that a fiber metal strip component, such as is described elsewhere, may not also function as a wear surface; a fiber metal strip also may function as a wear surface.

The dimples such as 462 in FIG. 4 are used to create a minimum standoff between the exit seal 400 inside the transition slot (such as 320 in FIG. 3B). That is, in embodiments in which a dimple is used, the dimple height is set by calculating the largest dimple that could be inserted into the smallest slot height. This would ensure proper seal assembly as well as set a maximum gap at the sealing surface and thus, limit the leakage. In one embodiment of eight dimples are provided on one dimple strip. This is shown in FIG. 6A. It is also appreciated that stress relief slots may be provided on either side (see FIG. 6B). Further, and generally, it is appreciated that dimples need not be provided on dimple strips as shown in these figures, but may alternatively be provided directly on the portion of the seal component that enters and engages the slot of the transition (such as is depicted in embodiments herein as slots in an integrated exit piece).

Figure 5A:
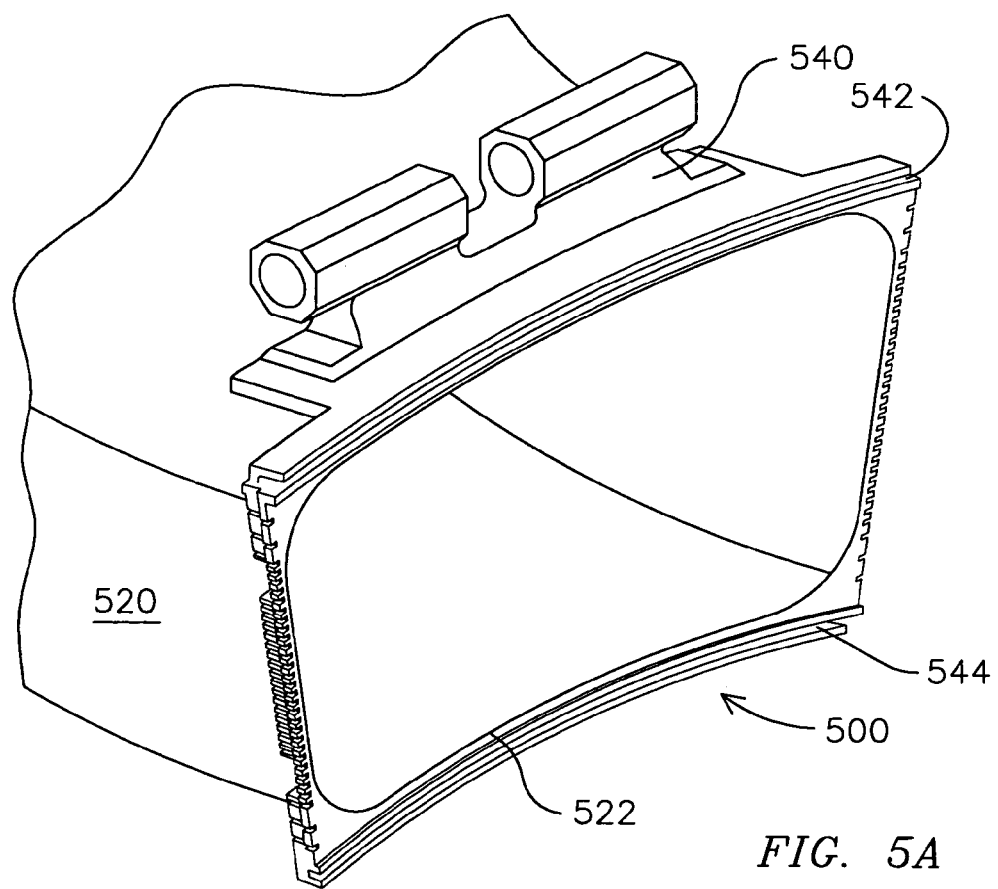
FIG. 5A provides a perspective view, looking downward and upstream, of a downstream portion of a transition that may be used with seal embodiments of the present invention, and as a component of system embodiments of the present invention.

Further to certain aspects of embodiments of a transition that may be used with the transition-to-turbine seal and as part of systems comprising such seal, FIG. 5A provides a side and top perspective view of the outlet end of a transition such as may be used. A transition 500 is comprised of a transition duct 520 having an outlet end 522 and an integrated exit piece 540 which is attached at the outlet end 522 to transition duct 520. The integrated exit piece 540 comprises an outer slot 542 and an inner slot 544 into which the first flattened section (not shown) of a transition-to-turbine seal of the present invention may be respectively inserted (e.g., see FIG. 3A). FIG. 5B provides a downstream directed view of one corner of the integrated exit piece 540 of FIG. 5A. Viewable are a plurality of cooling apertures 527 spaced along a surface 530 that is adjacent to the outlet end of the transition duct (not shown). For example, about 300 round cooling apertures, with a diameter between about 0.50 and 1.00 millimeters, may be provided in a single transition. Although these cooling apertures 527 are depicted as circular holes, this is not meant limit the term to a round aperture. Rather, the term "cooling aperture" is taken to mean any defined aperture through a body, including but not limited to a round hole, a elliptical hole, a conical hole, or otherwise shaped feature for the purpose of air cooling the surface.

Also viewable are side cooling slots 532 that provide for cooling between adjacent transitions and an exit seal rail notch 534. The exit seal rail notch 534, at one end of outer slot 542, may provide for a brush seal engagement between adjacent transitions, and may also receive tabs (discussed below) of transition-to-turbine seals.

Although FIGS. 5A and 5B depict a plurality of cooling apertures 527 in the transition 500, this approach is not meant to be limiting. Pluralities of cooling apertures (such as one plurality to shield an outer seal, and one plurality to shield an inner seal), may be provided, in various embodiments, in the row 1 vane segments, or both in the row 1 vane segments and in the transition. For example, positioning of such apertures in the row 1 vane segments may be toward the base of the vane seal rails, further toward the hot gas flow from the surfaces upon which the seal engages. Other locations also may be utilized. Regardless of the position, or whether on the transition or the row 1 vane segment or both, such pluralities of cooling apertures provide a respective air barrier effective to shield the respective transition-to-turbine seals from temperatures in the hot gas path.

The slight curvature of slots 542 and 544 in FIG. 5A indicate that the transition-to-turbine seal that fits into such slots, likewise requires a curvature. FIG. 6A provides a perspective view of a transition-to-turbine seal 600 that provides a view of a representative curvature of such component. In FIG. 6A can be viewed the transition-to-turbine seal 600 which is comprised of a seal component 601, a fiber metal strip 608, and an optional dimple strip 660. Eight dimples 662 are shown on the dimple strip 660. The seal component 601 is comprised of two plies 612 and 613, which together form a first flattened section 602 and a generally C-shaped section 604. As depicted in FIG. 6A, the layers or plies 612 and 613 are offset at the near end (and also at the far end, not viewable) so that adjacent transition-to-turbine seals 600 may have overlap, such as a ship lap type overlapping at their joining ends. Also depicted in FIG. 6A are cutouts 670 in the C-shaped section 604 which are provided to allow space for features of adjacent row 1 vane segments and vane mate face seals (not shown). The cutouts 670 also provide for restriction of circumferential shifting of the transition-to-turbine seal 600. It is noted that the curvature of the transition-to-turbine seal in FIG. 6A, which conforms to the arcuate shape of the row-1 vane segments and the transition to which this attaches, is not meant to be limiting. That is, the linear profile of transition-to-turbine seals may be linear or may have any desired curvilinear shape, and are not meant to be limited by such depiction of this and other embodiments depicted herein.

Figure 6C:
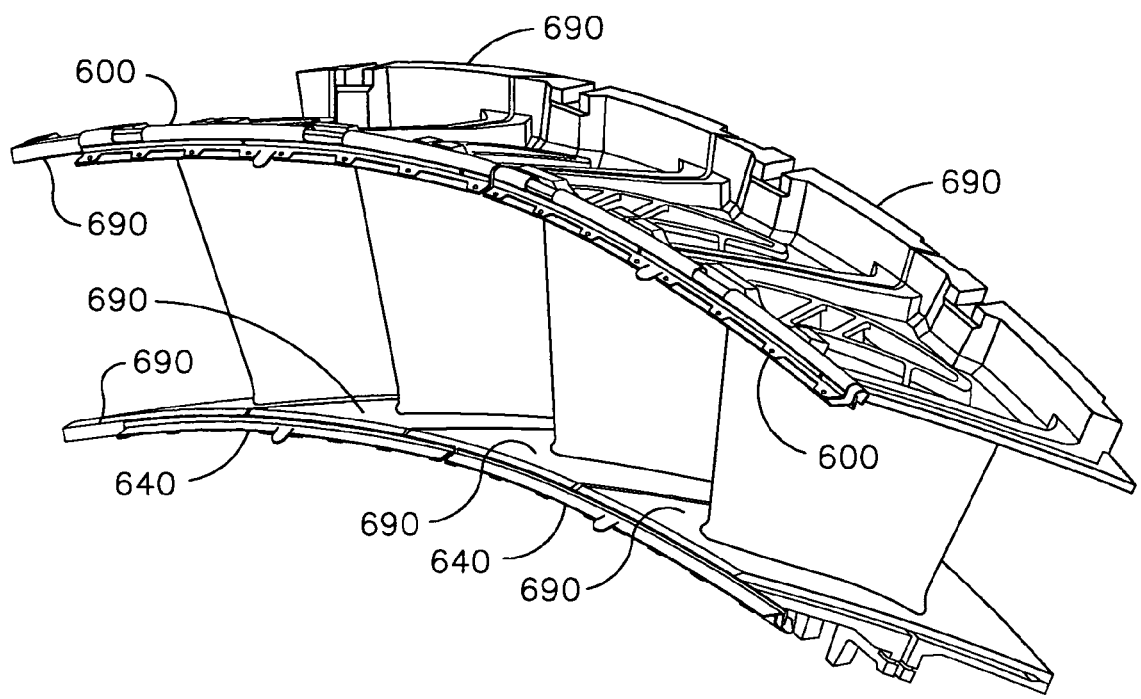
FIG. 6C provides a perspective view, looking downward and downstream, of outer and inner seals in place in four adjacent row 1 vane segments.

FIG. 6B provides a close up view of a portion of the transition-to-turbine seal 600 of FIG. 6A. Viewable are two dimples 662 along optional dimple strip 660. Also viewable are stress relief slots 670 between which is a side seal cover tab 680. The stress relief slots 670 are provided to accommodate thermal expansion and maintain seal dimensional integrity, and the side seal cover tab 680 provides a barrier to limit air flow between adjacent transitions (and may fit into an exit seal rail notch such as 534 in FIG. 5B). FIG. 6C provides a perspective view of four adjacent row 1 vane segments 690 with two outer transition-to-turbine seals 600 and two inner transition-to-turbine seals 640 attached thereto. In an exemplary arrangement, not meant to be limiting, one transition (such as transition 500 in FIG. 5A) is positioned in offset relation to three of these adjacent row 1 vane segments 690, and encompasses a total width of two row 1 vane segments. That is, in such exemplary arrangement, one transition would lie between the foreground- and the background-positioned side seal cover tabs 680 in FIG. 6C.

While not meant to be limiting of other assembly approaches, both the outer seal 600 and the inner seal 640 that are in the foreground of FIG. 6C extend about one-third of the length of a row 1 vane segment (not shown) of the next adjacent transition. This provides an overlap to reduce air flow losses that may more readily occur if adjacent seals joined at a junction of adjacent row 1 vane segments. Joints such as these, and the overlap features at the junction of adjacent multi-ply seal components, are effective to reduce overall air flow leakage into the hot air bulk stream and accordingly improve seal performance characteristics. These are in addition to the air loss limiting effect of the side seal cover tabs 680.

As to assembly in a gas turbine engine comprising an annular arrangement of transitions, in one embodiment the first inner seal to be installed is pressed over a row 1 vane inner seal rail. Pressing is required to overcome the preload of the spring-loaded C-shaped section of the seal. Then the same first seal is pressed over the rail of an adjacent inner row 1 vane. The chamfers on the vane seal rails facilitate this effort. The remaining inner seals are installed in the same fashion, with the last seal fitting over half of the first row 1 vane seal rail. All seals are then aligned to allow the flattened section of the seals to slide into the inner slot of the transitions (facilitated by the chamfers about the slot). Outer seals are then installed and aligned in a similar fashion. The transitions then are then carefully fitted over the flattened sections of both inner and outer seals, and are secured in place. It is noted that seals may be designed to extend over more or less than the length of two row 1 vane segments (as is provided in the above example).

Figure 7:
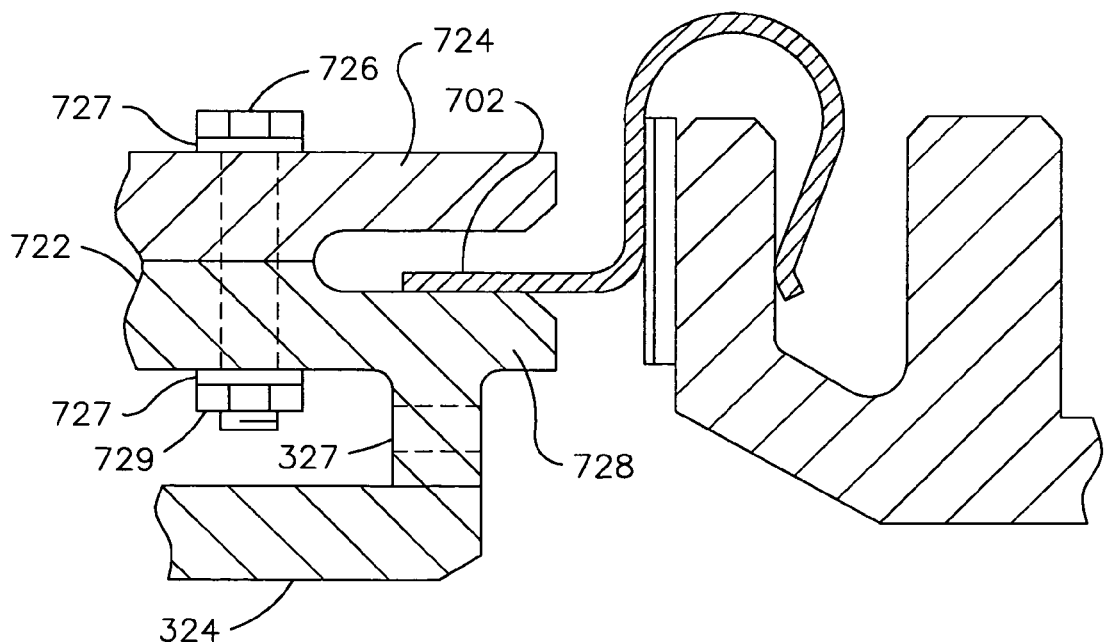
FIG. 7 provides an enlarged cross-sectional view, similar to FIG. 3B, depicting an alternative embodiment of an integrated exit piece of a transition.

Also, FIG. 7 provides a cross-sectional view, similar to FIG. 3B, that depicts an alternative, modified integrated exit piece 722 that may be utilized to assist in assembly of an outer transition-to-turbine seal. The modified integrated exit piece 722 comprises a removable top section 724 that attaches by bolt 726 to a base section 728 of the modified integrated exit piece 722. This provides for insertion of flattened section 702 into partially formed slot 720 during assembly. Then the top section 724 is positioned in place and is bolted solidly against base section 728 by bolt 726 (a number of which are provided for each integrated exit piece 722). An optional washer 727, and an optional nut 729 also are shown. Further to this and similar embodiments, to better assure stability of a modified integrated exit piece such as 722, one may appropriately select bolts (such as 726), washers (such as 727), and nuts (such as 729) for strength and non-loosening features during operation of a gas turbine engine. Washer options may include NORD-LOCK®-type self-locking, Belleville-type or tab types.

The above-depicted and described embodiments are not meant to be limiting. More generally, it is appreciated that transition-to-turbine seal embodiments of the present may be described as comprising two sections, a flattened section adapted to be received a slot at the outlet end of a transition, and a generally C-shaped section adapted to fit in spring-loaded sliding engagement about a vane seal rail of a row 1 vane segment, wherein in various embodiments the C-shaped section comprises generally opposed engagement surfaces for the sliding engagement with the vane seal rail. For example, the generally C-shaped section need not have the curvilinear aspects as the embodiment depicted in FIGS. 3A-4, and may instead have alternative curvilinear aspects as well as other arrangements of engagement surfaces. As to the latter point, the first engagement surface may or may not be a fiber metal strip (see, for example, FIG. 3C lacking such strip component), and alternatively may be a surface coating adhered to or inherent with the material of the generally C-shaped section. Thus, it is clearly intended that the scope of the claims is not meant to be limited by specific aspects of the depicted embodiments.

Embodiments of the present invention provide spring-loaded sliding engagement of the respective vane seal rails, forming seals that reduce passage of compressed air there through. That is, each of the opposed engagement surfaces of the C-shaped section provides a sealing function when, for example, it is in place against a surface of a vane seal rail, while the relatively more widened aspect of the C-shaped section, between these opposed engagement surfaces, provides sufficient space for unobstructed movement of a vane seal rail that fits between the opposed engagement surfaces. This sealing function alternatively may be described as comprising a means for sealing. Means for sealing, as used herein, includes any surface adhered to a portion of the C-shaped section that, by design, is adapted to contact a surface of a vane seal rail of a row 1 vane segment (or its equivalent), and more specifically includes: a wear resistant coating (inherent or applied, as are known to those skilled in the art); an additional metallic or ceramic layer attached to the section; a fiber metal strip (or other shape); a sprayed on partially compressible abradeable metal coating, possibly containing a fugitive material for porosity and/or an integral solid lubricant, a cloth metal, a brush seal, a rope seal, which may comprise ceramic or other compositions, a soft metal strip or other such embodiment intended to improve sealing. These may be attached by braze welding or resistance spot welding. When a ceramic rope seal is utilized, the ceramic may either be inside or outside of the metal component, and likewise the metal may appear on the inside or the outside of the rope seal. Also, it is appreciated that the term "means for encircling" may refer to the C-shaped section and other, similarly functioning components, of varying cross-sectional configurations, that provide a means for encircling a seal rail of a row 1 vane segment. As but one example, it is appreciated that a U-shaped section may be utilized over row 1 vane seal rails that comprise a truncated triangular cross-sectional profile (uniformly or non-uniformly sloping), so long as the U-shaped section comprises suitable means for sealing against the proximal area of the seal rails, and there is no undesired contact during operation between the more distal areas of the seal rails and the remainder of the U-shaped section. Accordingly, "means for encircling" encompasses, among other cross-sectional configurations, a U-shaped section. Also, it is appreciated that the means for encircling may not only encircle a seal rail as that term is used herein, but may also encircle analogously mating structures, such as extension flanges disposed in suitable orientation such as sealing rails attached to vane platforms or other static structure such as vane carrier rings.

Accordingly, aspects of the present invention relate to providing sealing functions with such structure, which may be embodied as a transition-to-turbine seal apparatus, and also as part of a sealing system for a transition-to-turbine interface. With FIGS. 3A to 7 providing examples, not meant to be limiting, it is appreciated that a sealing system for a transition-to-turbine interface in a gas turbine engine may be described to comprise the following:

1. a transition comprising a duct defining a boundary for a hot gas path, and further comprising an interior and an exterior slot and, between the duct and each said slot, a respective plurality of cooling apertures for passage of air, effective to establish an air barrier during operation;

2. a plurality of row 1 vane segments downstream and opposed the transition, each respective row 1 vane segment comprising an inner and an outer vane seal rail;

3. a first transition-to-turbine seal comprising a seal component comprising a flattened section adapted to be received in the transition interior slot, and a generally C-shaped section adapted to fit in spring-loaded sliding engagement about the inner vane seal rail, the C-shaped section comprising opposed engagement surfaces for said sliding engagement; and 4. a second transition-to-turbine seal comprising a seal component comprising a flattened section adapted to be received in the transition exterior slot, and a generally C-shaped section adapted to fit in spring-loaded sliding engagement about the outer vane seal rail, the C-shaped section comprising opposed engagement surfaces for said sliding engagement.

In such system, multiple sealing functions are present—such as along each side of each vane seal rail, provided by the opposed engagement surfaces as they contact respective sides of the respective vane seal rail. It is appreciated that the term "means for sealing" may alternatively be used in place of "opposed engagement surfaces" in the above description of systems of the present invention. Also, the term "means for encircling" may be used more generally and in place of "C-shaped section."

Also, as discussed elsewhere herein, it is appreciated that the respective transition-to-turbine seals may be offset in alignment, for examples so a seal seals half of the transition and three of the opposed row 1 vane segments, so as to provide a desired point of overlap. The degree of overlap and exact positioning of a seal with respect to adjacent transitions and row 1 vane segments may be varied without departing from the scope of the invention.

In another aspect, a system comprises a transition-to-turbine seal as described herein, and mating components comprising at least one transition and an appropriate number of row 1 vane segments for the at least one transition. The seal and its respective interfaces with these mating components takes into account transient and steady state deflections and thermal and dynamic loadings, of the mating components, as well as tolerance stacks, assembly constraints, and interface wear characteristics. Also, system configuration includes isolation of seal surfaces from the hot gas flow path, such as by cooling apertures that provide an air blanket.

Further, in various embodiments the transition-to-turbine seal's engagement surfaces, such as 408 and 423, and wear surfaces, such as 421 and 422 in FIG. 4, respectively comprise a material selected to promote preferential wear relative to wear of the adjacent surfaces of the transition (e.g., the slot inner walls) and the row 1 vane segment vane seal rail surfaces. This may be accomplished, for example, by the introduction of a compliant fiber metal strip or a porous, abradeable coating and/or other approaches for preferential wear, lubrication, and dedicated wear surfaces, as described elsewhere herein, and applicable to these and other components, surfaces, and paired surfaces. This is believed to contribute to lower cost seals than currently used seals, when all cost factors (including scheduled repair and replacement events) are considered.

Thus, embodiments of the present invention provide a compliant and robust transition-to-turbine seal that, through its preferential wear aspects, provides extended life to the adjacent transition and row 1 vane segments, while also providing more consistent performance based on its sealing functions.

All patents, patent applications, patent publications, and other publications referenced herein are hereby incorporated by reference in this application in order to more fully describe the state of the art to which the present invention pertains, to provide such teachings as are generally known to those skilled in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A transition-to-turbine seal for sealing a gap between an outlet of a gas turbine engine transition and a plurality of row 1 vane segments, the transition-to-turbine seal comprising:
   a seal component comprising a first, flattened section adapted to be received in a peripheral axially oriented slot in a transition outlet, and a second, generally C-shaped section locating a first engagement surface near the first, flattened section and comprising a curved portion extending to a second engagement surface spaced apart a specified distance from the first engagement surface;
   wherein the generally C-shaped section is adapted to provide a selected spring-loaded sliding engagement over a respective vertical flange of each of the row 1 vane segments.

2. The transition-to-turbine seal of claim 1, the generally C-shaped section additionally comprising a flattened portion adjacent the first, flattened section, the flattened portion locating the first engagement surface.

3. The transition-to-turbine seal of claim 2, additionally comprising a fiber metal strip adhered to the flattened portion and defining the first engagement surface.

4. The transition-to-turbine seal of claim 3, additionally comprising a plurality of dimples along or adjacent the flattened section, wherein added height of the dimples is effective to obtain a restricted radial movement of the flattened section when disposed in a transition slot.

5. The transition-to-turbine seal of claim 2, wherein the second engagement surface is adjacent a flared free end of the curved portion.

6. The transition-to-turbine seal of claim 2, the generally C-shaped section additionally comprising a second, flattened portion, the second, flattened portion locating the second engagement surface.

7. The transition-to-turbine seal of claim 6, wherein the second engagement surface is comprised of a fiber metal strip adhered to the second, flattened portion.

8. The transition-to-turbine seal of claim 6, wherein the second engagement surface is comprised of a metal strip sprayed with a porous abradable coating adhered to the second, flattened portion.

9. The transition-to-turbine seal of claim 2, additionally comprising a dimple strip comprising a plurality of dimples, wherein a portion of the dimple strip comprising the dimples fits against the flattened section, and wherein added height of the dimples is effective to obtain a restricted radial movement of the flattened section when disposed in a transition slot.

10. The transition-to-turbine seal of claim 1, wherein the seal component is multi-ply.

11. The transition-to-turbine seal of claim 1, wherein the seal component is two-ply.

12. A gas turbine engine comprising the transition-to-turbine seal of claim 1.

13. A sealing system for a transition-to-turbine interface in a gas turbine engine comprising:
   a transition comprising a duct defining a boundary for a hot gas path and at an outlet end an interior and an exterior slot;
   a plurality of row 1 vane segments downstream and opposed the transition, each respective row 1 vane segment comprising an inner and an outer vane seal rail, wherein at least one of the transition and the plurality of row 1 vane segments further comprise respective pluralities of cooling apertures for passage of air, each respective plurality effective to establish, during operation, a respective air barrier effective to shield the respective first and second transition-to-turbine seals from temperatures in the hot gas path;
   the first transition-to-turbine seal comprising a seal component, outwardly disposed from the plurality of cooling apertures, comprising a flattened section adapted to be received in the transition interior slot, and a generally C-shaped section adapted to fit in spring-loaded sliding engagement about the inner vane seal rail, the C-shaped section comprising opposed engagement surfaces for said sliding engagement; and
   the second transition-to-turbine seal comprising a seal component, outwardly disposed from the plurality of cooling apertures, comprising a flattened section adapted to be received in the transition exterior slot, and a generally C-shaped section adapted to fit in spring-loaded sliding engagement about the exterior vane seal rail, the C-shaped section comprising opposed engagement surfaces for said sliding engagement;
   wherein each respective plurality of cooling apertures is effective to shield the respective outwardly disposed first and second transition-to-turbine seals from hot gas path temperatures.

14. The sealing system of claim 13, the transition comprising an integrated exit piece fitting about the duct and comprising the interior and the exterior slot and comprising the respective pluralities of cooling apertures.

15. The sealing system of claim 13, wherein the transition outlet exterior slot is formed by attachment of an attachable member, comprising an exterior wall defining the slot, to a mating member positioned about the duct.

16. The sealing system of claim 15, wherein the attachable member and the mating member comprise a modified integrated exit piece.

17. A sealing system for a transition-to-turbine interface in a gas turbine engine comprising:
- a transition comprising a duct defining a boundary for a hot gas path, and further comprising at an outlet end an interior and an exterior slot and, between the duct and each said slot, a respective plurality of cooling apertures for passage of air, effective to establish a respective air barrier during operation;
- a plurality of row 1 vane segments downstream and opposed the transition, each respective row 1 vane segment comprising an inner and an outer vane segment flange;
- a first transition-to-turbine seal comprising a seal component comprising a flattened section adapted to be received in the transition interior slot, and a means for encircling adapted to fit in spring-loaded sliding engagement about the inner vane segment flange, the means for encircling comprising opposed means for sealing against opposite sides of the inner vane segment flange; and
- a second transition-to-turbine seal comprising a seal component comprising a flattened section adapted to be received in the transition exterior slot, and a means for encircling adapted to fit in spring-loaded sliding engagement about the exterior vane segment flange, the means for encircling comprising opposed means for sealing against opposite sides of the outer vane segment flange;
- wherein the first and the second transition-to-turbine seals each are respectively displaced radially away from the hot gas path, and wherein each respective plurality of cooling apertures is effective to shield the respective radially displaced first and second transition-to-turbine seals from hot gas path temperatures.

18. The sealing system of claim 17, the transition comprising an integrated exit piece fitting about the duct and comprising the interior and the exterior slot and the respective pluralities of cooling apertures.

19. The sealing system of claim 17, wherein the transition outlet exterior slot is formed by attachment of an attachable member, comprising an exterior wall defining the slot, to a mating member positioned about the duct.

20. The sealing system of claim 19, wherein the attachable member and the mating member comprise a modified integrated exit piece.

21. A gas turbine engine comprising the sealing system of claim 17.

* * * * *